(12) United States Patent
Lee et al.

(10) Patent No.: US 12,524,302 B2
(45) Date of Patent: Jan. 13, 2026

(54) SEMICONDUCTOR MEMORY DEVICE AND OPERATING METHOD THEREOF

(71) Applicant: SAMSUNG ELECTRONICS CO., LTD., Suwon-si (KR)

(72) Inventors: Myungkyu Lee, Suwon-si (KR); Seongmuk Kang, Suwon-si (KR); Jae-Gon Lee, Suwon-si (KR); Kyomin Sohn, Suwon-si (KR); Yeonggeol Song, Suwon-si (KR); Kijun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 6 days.

(21) Appl. No.: 18/770,435

(22) Filed: Jul. 11, 2024

(65) Prior Publication Data

US 2025/0036521 A1    Jan. 30, 2025

(30) Foreign Application Priority Data

Jul. 26, 2023 (KR) .................. 10-2023-0097628
Nov. 8, 2023 (KR) .................. 10-2023-0153770

(51) Int. Cl.
    *G06F 11/10*     (2006.01)
    *G11C 29/42*     (2006.01)

(52) U.S. Cl.
    CPC ........ *G06F 11/1008* (2013.01); *G06F 11/102* (2013.01); *G06F 11/1048* (2013.01); *G11C 29/42* (2013.01)

(58) Field of Classification Search
    CPC ............. G06F 11/1008; G06F 11/1048; G06F 11/102; G11C 29/42

USPC ................ 714/763, 768, 773, 784, 799, 703
See application file for complete search history.

(56) References Cited

U.S. PATENT DOCUMENTS

| | | | |
|---|---|---|---|
| 9,354,970 B2 | 5/2016 | La Fetra et al. | |
| 2014/0245099 A1* | 8/2014 | Kokubun | H03M 13/152 |
| | | | 714/755 |
| 2020/0125445 A1* | 4/2020 | Lee | G06F 11/1076 |
| 2022/0035706 A1* | 2/2022 | Laurent | G06F 11/1012 |
| 2022/0035707 A1* | 2/2022 | Laurent | G06F 11/1076 |

(Continued)

FOREIGN PATENT DOCUMENTS

| | | |
|---|---|---|
| KR | 10-2023-0055614 | 4/2023 |
| WO | WO 2022139849 | 6/2022 |

*Primary Examiner* — John J Tabone, Jr.
(74) *Attorney, Agent, or Firm* — Fish & Richardson P.C.

(57) ABSTRACT

An example CXL (Compute eXpress Link)-based memory module includes a memory device and a controller. The memory device includes a plurality of volatile memory cells and stores data or reads the stored data. The controller communicates with a host device through a CXL interface and controls the memory device. The controller includes an error correction code (ECC) circuit that generates a first codeword by adding a parity vector generated based on Reed-Solomon encoding to data received from the host device, an error injecting circuit that generates an error symbol and generates a second codeword by injecting the error symbol into at least a portion of the first codeword, and a memory device interface that controls the memory device such that the second codeword where the error symbol is injected is stored in the memory device. The controller determines a number of error symbols to be injected into the second codeword.

20 Claims, 11 Drawing Sheets

(56) References Cited

U.S. PATENT DOCUMENTS

| | | |
|---|---|---|
| 2022/0091921 A1 | 3/2022 | Balakrishnan et al. |
| 2023/0119341 A1 | 4/2023 | Alzheimer et al. |
| 2023/0119555 A1 | 4/2023 | Kim et al. |
| 2024/0281323 A1* | 8/2024 | Lee ............... G06F 11/1044 |
| 2024/0385925 A1* | 11/2024 | Lee ............... G06F 11/1064 |
| 2025/0036521 A1* | 1/2025 | Lee ............... G06F 11/1008 |

* cited by examiner

| MEMORY ADDRESS | ERASURE POSITION | NUMBER OF ERASURES |
|---|---|---|
| ... | ... | ... |
| 0x001FFFFF | 1, 3 | 2 |
| 0x00100000 | 0, 3, 13, 20 | 4 |
| ... | ... | ... |

FIG. 7

| STATUS | POISON FLAG | UE FLAG |
|---|---|---|
| NORMAL | 0 | 0 |
| UNCORRECTABLE ERROR | 0 | 1 |
| UNCORRECTABLE ERROR OR POISON | 1 | 1 |

SEMICONDUCTOR MEMORY DEVICE AND OPERATING METHOD THEREOF

CROSS-REFERENCE TO RELATED APPLICATIONS

This application claims priority under 35 U.S.C. § 119 to Korean Patent Application Nos. 10-2023-0097628 filed on Jul. 26, 2023, and 10-2023-0153770 filed on Nov. 8, 2023, in the Korean Intellectual Property Office, the disclosures of which are incorporated by reference herein in their entireties.

BACKGROUND

A semiconductor memory device is used to store data and is classified as a volatile memory device or a nonvolatile memory device.

A volatile memory device such as a dynamic random access memory (DRAM) is provided with data to be stored from a host device. The data received from the host device may be poisoned data. For example, the reliability of data may be suspected due to an error caused in a cache memory of the host device or an internal data transmission path of the host device. In this case, the host device may transmit additional information notifying the poison of data together with data to be transmitted to the DRAM so as to be stored therein. For example, a poison flag may be transmitted together with the poisoned data.

When a read request for the poisoned data is received from the host device, the volatile memory device transmits the poison flag together. For this reason, the volatile memory device manages the poison flag together with data. Accordingly, the volatile memory device with a high degree of integration is desired to efficiently manage the poison flag.

SUMMARY

The present disclosure relates to a semiconductor memory device capable of efficiently managing a poison flag.

In some implementations, a CXL (Compute eXpress Link)-based memory module may include a memory device that includes a plurality of volatile memory cells, the memory device configured to store data or to read the stored data, and a controller configured to communicate with a host device through a CXL interface and to control the memory device. The controller may include an error correction code (ECC) circuit configured to generate a first codeword based on adding a parity vector to data received from the host device, the parity vector being generated based on Reed-Solomon encoding, an error injecting circuit configured to generate at least one error symbol and to generate a second codeword based on injecting the at least one error symbol into at least a portion of the first codeword, and a memory device interface configured to control the memory device such that the second codeword where the at least one error symbol is injected is stored in the memory device, and the controller may determine a variable number of the at least one error symbol to be injected into the first codeword.

In some implementations, an operating method of a controller which controls a memory device may include receiving, at the controller, an instruction to store data from a host device together with a poison flag through a CXL (Compute eXpress Link) interface, adding, at the controller, a parity vector to the data received from the host to generate a first codeword, the parity vector being generated based on Reed-Solomon (RS) encoding, injecting, at the controller, at least one error symbol into at least a portion of the first codeword to generate a second codeword, and controlling, at the controller, the memory device such that the second codeword in which the at least one error symbol is injected is stored, and a variable number of the at least one error symbol to be injected into the first codeword is determined by the controller.

In some implementations, a computing device may include a central processing unit (CPU), a memory device including a plurality of volatile memory cells, and a controller configured to communicate with the central processing unit through a CXL (Compute eXpress Link) interface and control the memory device based on a command and an address that the central processing unit transmits. The memory device may be configured to store or read data in or from the plurality of memory cells under control of the controller, and the controller is configured to determine a variable number of at least one error symbol based on the address, generate the at least one error symbol based on the variable number of the at least one error symbol, and inject the at least one error symbol into at least a portion of a codeword, the codeword being generated based on data received from the central processing unit.

BRIEF DESCRIPTION OF THE DRAWINGS

The above and other objects and features of the present disclosure will become apparent by describing in detail implementations thereof with reference to the accompanying drawings.

FIG. 7 is an example diagram illustrating a poison flag and an uncorrectable error (UE) flag.

DETAILED DESCRIPTION

Below, implementations of the present disclosure will be described in detail and clearly to such an extent that an ordinary one in the art easily carries out the present disclosure.

Figure 1:
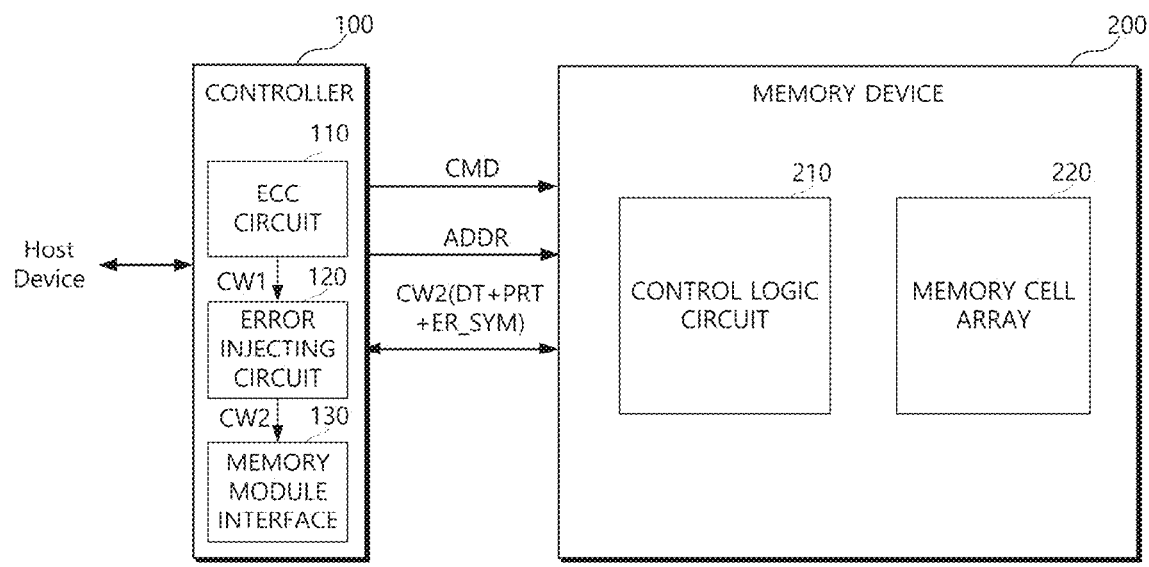
FIG. 1 is a block diagram illustrating an example of a memory module.

FIG. 1 is a block diagram illustrating an example of a memory module.

A memory module 10 may store poisoned data received from a host device in a memory device 200. When the poisoned data are read from the memory device 200, the memory module 10 may manage poison information such that a controller 100 is capable of checking whether the read data are poisoned data. The memory module 10 may efficiently store poison information in the memory device 200 without using an additional storage space. To this end, the controller 100 may inject an error symbol into at least a portion of a codeword obtained by performing error correction code (ECC) encoding for the data received from the host device. The codeword into which the error symbol is injected may be transmitted to the memory device 200 to be stored therein. Accordingly, an additional storage space is not required to store poison information. Also, the controller 100 may inject error symbols, which allows an error range (or error level) to exceed an error correction capability of an error correction circuit, and thus, the poisoned data may not be lost due to the mis-correction of the controller 100 at the time of reading poisoned data. The controller 100 may inject error symbols, the number of which adaptively changes, into the codeword such that the mis-correction is not caused. That is, the number of error symbols to be injected into the codeword may be variably determined.

The description will be given in detail with reference to FIG. 1. Referring to FIG. 1, the memory module 10 may include the controller 100 and the memory device 200.

The memory module 10 may be a CXL (Compute eXpress Link) DRAM device. For example, the memory module 10 may be connected to a central processing unit (CPU), a graphic processing unit (GPU), an AI accelerator, a storage device, etc. of the host device based on the PCIe (Peripheral Component Interconnect Express) interface. The memory module 10 may support a cache-coherent interconnect.

The controller 100 may control the memory device 200. For example, the controller 100 may control the memory device 200 depending on a request of a processor supporting various applications such as a server application, a personal computer (PC) application, and a mobile application. The controller 100 may communicate with the host device including a processor by using the CXL protocol and may control the memory device 200 depending on a request of the processor. For example, the controller 100 may communicate with the host device on the PCIe bus based on the CXL.IO protocol and may control the memory device 200 based on the CXL.memory protocol.

The controller 100 and the memory device 200 may be implemented in one package. Alternatively, the controller 100 and the memory device 200 may communicate with each other on the same bus connected to the host device and may be implemented in different packages.

To control the memory device 200, the controller 100 may transmit a command and/or an address to the memory device 200. Also, the controller 100 may transmit data to the memory device 200 or may receive data from the memory device 200. Data may be a codeword CW.

The memory device 200 may receive the codeword from the controller 100 and may store the codeword thus received. The memory device 200 may read the stored codeword in response to a request of the controller 100 and may transmit the read data to the controller 100. For example, the memory device 200 may be configured to receive a command and/or an address from the controller 100, to access a region of a memory cell array 220, which is selected by the address, and to perform an operation indicated by the command with respect to the selected region. For example, the memory device 200 may perform a write operation, a read operation, and an erase operation.

In some implementations, the memory device 200 may include volatile memory cells. For example, the memory device 200 may include various DRAM devices such as a double data rate synchronous dynamic random access memory (DDR SDRAM), a DDR2 SDRAM, a DDR3 SDRAM, a DDR4 SDRAM, a DDR5 SDRAM, a DDR6 SDRAM, a low power double data rate (LPDDR) SDRAM, an LPDDR2 SDRAM, an LPDDR3 SDRAM, an LPDDR4 SDRAM, an LPDDR4X SDRAM, an LPDDR5 SDRAM, a graphics double data rate synchronous graphics random access memory (GDDR SGRAM), a GDDR2 SGRAM, a GDDR3 SGRAM, a GDDR4 SGRAM, a GDDR5 SGRAM, and a GDDR6 SGRAM.

Also, in some implementations, the memory device 200 may be a stacked memory device, in which DRAM dies are stacked, such as a high bandwidth memory (HBM), an HBM2, or an HBM3.

Also, in some implementations, the memory device 200 may include an SRAM device, a NAND flash memory device, a NOR flash memory device, an RRAM device, an FRAM device, a PRAM device, a TRAM device, an MRAM device, etc.

The memory device 200 may include a control logic circuit 210 and the memory cell array 220.

The control logic circuit 210 may control operations of the memory device 200. For example, the control logic circuit 210 may generate control signals such that the memory device 200 performs the write operation or the read operation.

The memory cell array 220 may include a plurality of banks, each of which includes memory cells for storing data. For convenience of description, in the specification, it is assumed that each bank includes DRAM cells. However, this is provided as an example, and each of the plurality of banks may be implemented to include any other volatile memory cells in addition to the DRAM cells. Also, the plurality of banks n may be implemented to include the same kind of memory cells or may be implemented to include different kinds of memory cells.

The controller 100 may include an ECC circuit 110, an error injecting circuit 120, and a memory module interface 130.

The ECC circuit 110 may add parity information to data received from the host device. For example, the ECC circuit 110 may perform ECC encoding for the received data to generate a parity vector PRT in which parity information is composed of a parity symbol and may add the generated parity vector PRT to data DQ to generate a first codeword CW1. In some implementations, the ECC circuit 110 may perform ECC encoding based on a Reed-Solomon (RS) code.

The error injecting circuit 120 may inject an error symbol ER_SYM into the first codeword CW1 for the purpose of recording poison information at the first codeword CW1 which the ECC circuit 110 generates. The error injecting circuit 120 may generate a second codeword CW2 where the error symbol ER_SYM is injected, by injecting the error symbol ER_SYM into at least a portion of a region of the first codeword CW1, which the data DQ are recorded, or at least portion of a region of the first codeword CW1, in which the parity vector PRT is recorded. In some implementations, the error injecting circuit 120 may inject the error symbol ER_SYM into the first codeword CW1 in response to a flag value of a poison flag PF which the host device transmits. For example, when the poison flag PF is set (e.g., is set to "1") together with data by the host device, the error injecting circuit 120 may inject the error symbol ER_SYM into the first codeword CW1.

The memory module interface 130 may transmit a command CMD, an address ADDR, and the second codeword CW2 to the memory device 200. The command CMD may indicate to write the second codeword CW2 in the memory cell array 220, and the address ADDR may be a page address of the memory cell array 220, at which the second codeword CW2 is to be written.

The ECC circuit 110 may perform ECC decoding for a codeword read from the memory device 200 in response to a read command of the host device.

When the read codeword is the second codeword CW2 into which the error symbol ER_SYM is injected, the ECC circuit 110 may determine whether the error symbol ER_SYM is injected. When it is determined that the error symbol ER_SYM is injected into the second codeword CW2 thus read, the ECC circuit 110 may generate the poison flag PF which is set (i.e., is set to "1"). The controller 100 may transmit the set poison flag PF to the host device together with data decoded from the second codeword CW2. In some implementations, when an ECC decoding result of the second codeword CW2 into which the error symbol ER_SYM is injected indicates that an uncorrectable error (UE) occurs, the controller 100 may determine that the error symbol ER_SYM is injected into the second codeword CW2.

The error injecting circuit 120 may adaptively determine the number of error symbols ER_SYM to be injected into the first codeword CW1. That is, the number of error symbols ER_SYM may be variable. For example, the error injecting circuit 120 may determine the number of error symbols which allow an error range (or error level) to exceed the error correction capability associated with the execution of ECC decoding of the ECC circuit 110.

For example, the ECC circuit 110 may perform RS code-based decoding. In detail, the ECC circuit 110 may correct a codeword based on error-and-erasure decoding utilizing erasure information.

In the Reed-Solomon (RS) which is defined by a finite field or Galois field GF ($2^m$), one symbol is composed of m bits, a maximum code length is ($2^m-1$), the correction capability associated with "P" being the number of parity symbols has a floor function value of P/2. For example, assuming the reed-Solomon (RS) code (K=32 and P=8) defined by GF($2^8$), a symbol is composed of 8 bits, the number of data symbols is 32, and the number of parity symbols is 8. In this case, when error-only decoding is used, arbitrary 4 error symbols may be corrected within a symbol whose total codeword length is 40. However, when the error-and-erasure decoding utilizing an error and erasure information is used, the maximum number of correctable symbols increase to 6 (i.e., 4 erasure symbols and 2 error symbols).

For example, in the case of using the reed-Solomon (RS) (K=32 and P=8) defined by GF($2^8$), a codeword into which 3 error symbols are injected to store poison information may be written in the memory device 200, and a symbol error of a correctable range may occur at the read codeword. In this case, unlike the intension to inject the error symbol ER_SYM after ECC encoding, the mis-correction that an ECC decoding result indicates that a correctable error (CE) occurs may be caused. Accordingly, a cleared poison flag (i.e., set to "0") meaning that data to be transmitted are not poisoned data may be transmitted to the host device. In this case, there may be the probability that a system freeze occurs at the host device.

In the case of performing RS code-based error decoding, the error injecting circuit 120 may inject error symbols, the number of which is $\lfloor P/2 \rfloor +1$ or more (P being the number of parity symbols), to record poison information. In some implementations, $\lfloor R \rfloor$ which is a floor function outputs the greatest integer which is smaller than or equal to R.

In particular, in the case of using the error-and-erasure decoding, because erasure information being pre-information about a symbol error is given, a greater number of errors may be corrected compared to error decoding. Accordingly, the probability that the mis-correction occurs increases.

When the ECC circuit 110 performs RS code-based error-and-erasure decoding, the error injecting circuit 120 may inject error symbols, the number of which varies depending on the number of erasure information, to record poison information.

Accordingly, unlike the conventional manner where error symbols, the number of which is uniform, are injected, the memory module 10 may solve the issue that poison information is not maintained due to the mis-correction in the process of performing ECC decoding. Even in the error-and-erasure decoding utilizing erasure information, poison information may be prevented from being removed due to the mis-correction. That is, the memory module 10 may inject error symbols, the number of which adaptively changes to exceed the error correction capability range of the ECC circuit 110, into a codeword, and thus, the ability to maintain poison information of a codeword where the poison information is recorded may be improved. That is, the number of error symbols to be injected into the codeword may be variably determined.

Figure 2:
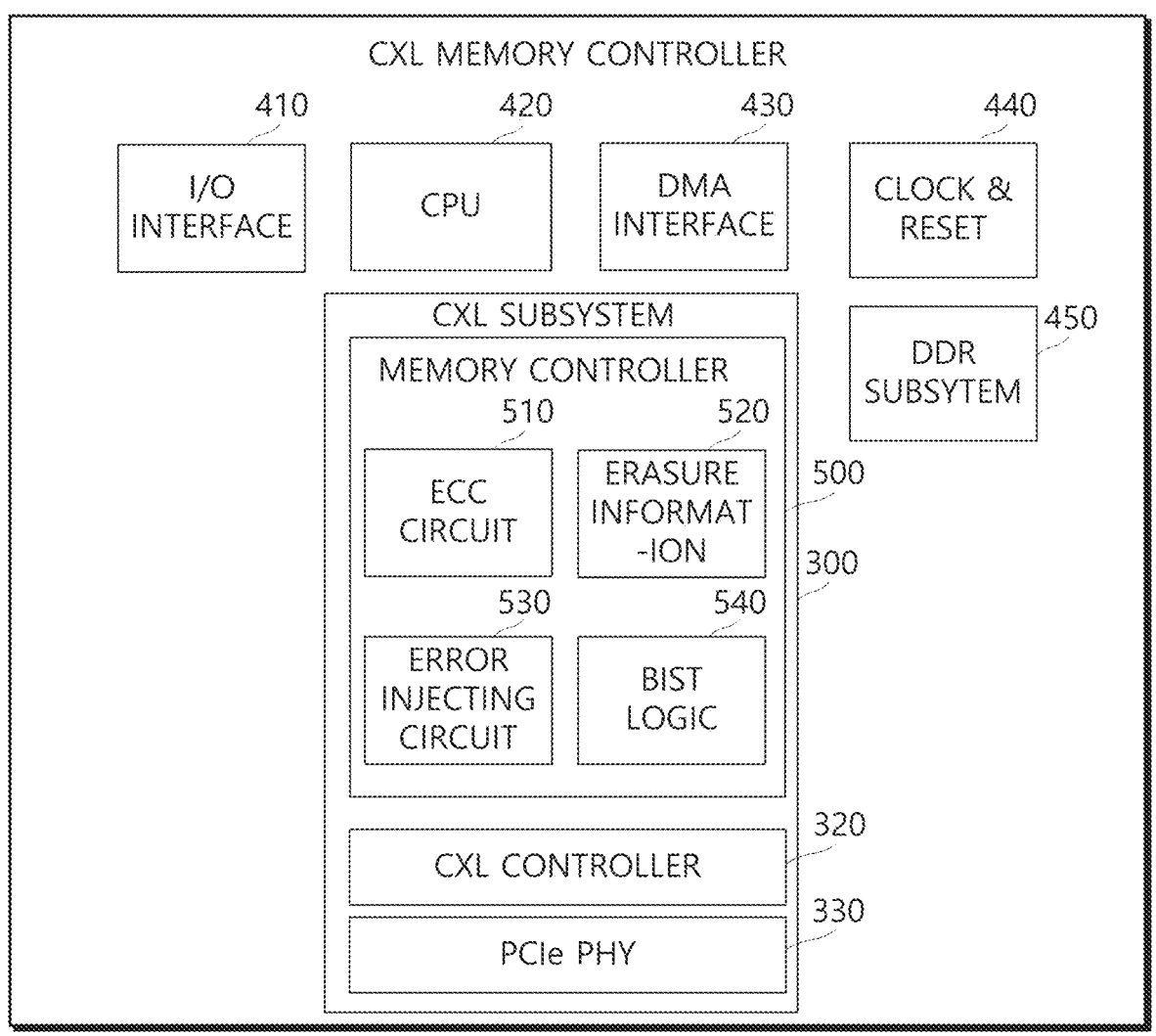
FIG. 2 is a block diagram illustrating an example of a memory controller.

FIG. 2 is a block diagram illustrating an example of a controller. A controller 100a of FIG. 2 may correspond to the controller 100 of FIG. 1. The controller 100a will be described with reference to FIGS. 1 and 2. The controller 100a may be a CXL memory controller which performs communication based on the CXL protocol.

Referring to FIG. 2, the controller 100a may include an I/O interface 410, a central processing unit (CPU) 420, a direct memory access (DMA) interface 430, a clock and reset generator 440, a double data rate (DDR) subsystem 450, and a CXL subsystem 300.

The I/O interface 410 is a communication interface which performs communication with an external peripheral device. The I/O interface 410 may be an UART (Universal Asynchronous Receiver/Transmitter) interface, a JTAG (Joint Test Action Group) slave interface, a GPIO (General-Purpose Input/Output) interface, an SPI (Serial Peripheral Interface) master interface, an I3C master interface, etc. depending on some implementations.

The CPU 420 may control an overall operation of the controller 100a.

The DMA interface 430 performs a direct access of the external peripheral devices to the memory device 200 of FIG. 1.

The clock and reset generator 440 may generate a clock and may provide the generated clock to the memory device 200 of FIG. 1 through the DDR subsystem 450.

The DDR subsystem 450 may include a DDR4 and/or DDR5 controller, a DDR4 and/or DDR5 physical layer, and a phase locked loop (PLL). The DDR subsystem 450 may communicate with the memory device 200 of FIG. 1 through the DDR interface. The DDR subsystem 450 may be the memory module interface 130 of FIG. 1.

The CxL subsystem 300 may include a CXL controller 320, a PCIe physical layer (PHY) 330, and a memory controller 500.

The CxL subsystem 300 may communicate with the host device or any other CXL device on the PCIe bus through the PCIe physical layer 330 in compliance with the CXL protocol. The CXL protocol may be a CXL.IO protocol.

The CXL controller 320 may communicate with the memory controller 500 and may provide the memory controller 500 with an interface of a CXL transaction layer and a CXL link layer. Also, the CXL controller 320 may provide the memory controller 500 with an interface of a PCIe transaction layer and a PCIe data link layer. The CXL controller 320 may transfer a response of the memory controller 500 to the PCIe physical layer 330 and may provide the CXL controller 320 with a message received from the host device or any other CXL device through the PCIe physical layer 330.

The CXL controller 320 may transmit a message (e.g., a command and an address) of the memory controller 500, which is associated with the memory device 200 of FIG. 1, to the memory device 200 of FIG. 1 through the DDR subsystem 450.

The memory controller 500 may include an ECC circuit 510, erasure information 520, an error injecting circuit 530, and BIST (Built-in Self-Test) logic 540. The ECC circuit 510 and the error injecting circuit 530 may respectively correspond to the ECC circuit 110 and the error injecting circuit 120 of FIG. 1.

The ECC circuit 510 may receive data from the host device through the CXL controller 320, may perform ECC encoding for the received data to generate parity information, and may add the generated parity information to the received data to generate a codeword. For example, the ECC circuit 510 may generate the parity information by performing ECC encoding based on the Reed-Solomon (RS) code.

In some implementations, the ECC circuit 510 may receive data and a poison flag from the host device. The ECC circuit 510 may provide the generated codeword and the poison flag to the error injecting circuit 530. According to some implementations, the poison flag may be directly provided from the CXL controller 320 to the error injecting circuit 530. Also, according to some implementations, the ECC circuit 510 may check the poison flag; when the poison flag is a cleared poison flag, the ECC circuit 510 may provide the codeword to the memory device 200.

In response to the poison flag, the error injecting circuit 530 may inject an error symbol into the codeword provided from the ECC circuit 510. The error injecting circuit 530 may inject error symbols, the number of which is adaptively changed to exceed the error correction capability range of the ECC circuit 510, into the codeword. For example, when the ECC circuit 510 performs RS code-based error decoding, the error injecting circuit 530 may inject error symbols, the number of which is $\lfloor P/2 \rfloor + 1$ or more (P being the number of parity symbols), to record the poison information. When the ECC circuit 510 performs RS code-based error-and-erasure decoding, the error injecting circuit 530 may determine the number of error symbols based on erasure information for the purpose of recording the poison information, may generate an error vector by using the error symbols, the number of which is thus determined, and may add the generated error vector to the codeword. The error injecting circuit 530 may provide the memory device 200 with the codeword, to which the error vector is added, for the purpose of writing the codeword to which the error vector is added.

The ECC circuit 510 may determine whether a codeword provided from the memory device 200 is a codeword into which error information is injected. The ECC circuit 510 may determine a codeword where error information is injected, by comparing a syndrome generated based on the codeword with a syndrome generated based on the error vector. When the codeword is the codeword where the error information is injected, the ECC circuit 510 may set the poison flag (e.g., may set the poison flag to "1"). The controller 100a may transmit the set poison flag to the host device together with the data. Alternatively, the controller 100a may only transmit information where the poison flag is included, to the host device as a response to the data read request. According to some implementations, the controller 100a may transmit a set UE flag to the host device together with the poison flag.

The ECC circuit 510 may correct an error by decoding the codeword provided from the memory device 200. The ECC circuit 510 may perform RS code-based error decoding or may perform RS code-based error-and-erasure decoding.

In some implementations, the erasure information 520 may be generated based on information about a test operation which is performed before the production of a memory module is completed. In some implementations, the erasure information 520 may be updated by BIST logic 540 every initial operation of a memory module.

The BIST logic 540 may store the erasure information 520 in a memory. The erasure information 520 may be stored in a read only memory (ROM) of the controller 100a. The erasure information 520 stored in the ROM may be loaded to a static RAM (SRAM) of the controller 100a and may be used by the ECC circuit 510 and/or the error injecting circuit 530.

The BIST logic 540 may be implemented with a BIOS (Basic Input Output System) of the controller 100a or may be implemented with a separate logic circuit. The BIST logic 540 may be enabled in an initial operation of a memory module and may detect an error of each cell of the memory device 200. The BIST logic 540 may store the erasure information 520 including positions and the number of cells where an error is detected, in the ROM in the form of an erasure table. In some implementations, when a VRT (Variable Retention Time) defect is detected, the BIST logic 540 may determine a defective cell through the following process: 1) apply a power to the memory device 200 such that the memory device 200 is initialized, 2) fill all cells with charges, 3) vary a cell refresh time such that an error is forced to appear in a cell, and 4) read cell data. In addition, the BIST logic 540 may detect an error of a cell due to wear and deterioration through various cell defect algorithms.

Accordingly, the controller 100a described with reference to FIG. 2 may determine the number of error symbols such that an error range (or error level) exceed the error correction capability range of the ECC circuit 110 associated with the execution of ECC decoding and thus may accurately identify a codeword where error information is injected, without the probability of mis-correction even in the case where the codeword where the error information is injected is read from the memory device 200. Also, even in the case where the ECC circuit 510 perform RS code-based error-and-erasure decoding, the controller 100a may determine the number of error symbols without the probability of mis-correction by utilizing erasure information stored in advance.

Figures 3, 4:
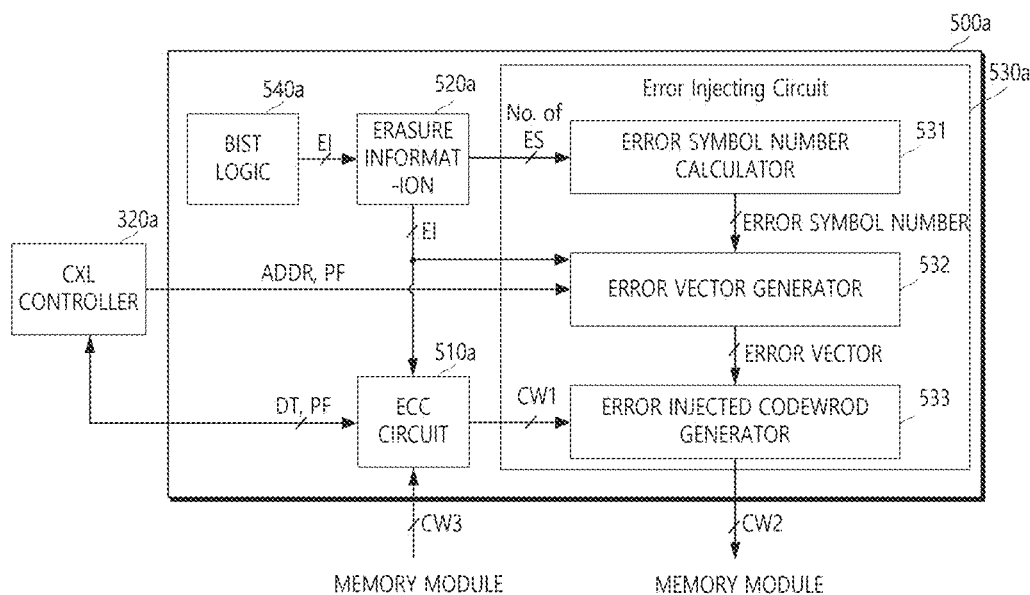
FIG. 3 is a block diagram illustrating an example of a memory controller.
FIG. 4 is a diagram describing an example erasure table where erasure information is recorded.

FIG. 3 is a block diagram illustrating an example of a memory controller 500a. The memory controller 500a may correspond to the memory controller 500 of FIG. 2. Additional description which is the same as or similar to the description given with reference to FIG. 2 will be omitted to avoid redundancy.

Referring to FIG. 3, the memory controller 500a may include an ECC circuit 510a, erasure information 520a, an error injecting circuit 530a, and BIST logic 540a.

The ECC circuit 510a may receive the poison flag PF and data DT to be written in the memory device 200 from the host device through a CXL controller 320a. The ECC circuit 510a may perform ECC encoding for the data DT to generate parity information and may add the parity information to the data DT to generate the first codeword CW1. The ECC encoding may be RS code-based encoding. When the ECC circuit 510a perform the RS code-based encoding, the parity information may be a parity vector composed of a plurality of parity symbols. The first codeword CW1 may be composed of a parity symbol and a data symbol obtained by encoding the data DT The ECC circuit 510a may provide the error injecting circuit 530a with the first codeword CW1 thus generated. According to some implementations, when the poison flag PF provided from the host device is a cleared poison flag PF, the ECC circuit 510a may directly provide the first codeword CW1 to the memory device 200.

The BIST logic 540a may be enabled in an initial operation of a memory module and may detect an error of each cell of the memory device 200. In some implementations, the BIST logic 540a may be repeatedly enabled every initial operation of a memory module. Whenever the BIST logic 540a is enabled, the BIST logic 540 may record error information EI of cells determined as an error cell in the ROM as the erasure information 520a. Accordingly, the erasure information 520a may be updated every operation of a memory module.

When the ECC circuit 510a performs the RS code-based error-and-erasure decoding, the error injecting circuit 530a may determine the number of error symbols, which allow an error range (or error level) to exceed the error correction capability of the ECC circuit 510a associated with error-and-erasure decoding, based on the pre-stored erasure information 520a.

The error injecting circuit 530a may include an error symbol number calculator 531, an error vector generator 532, and an error injected codeword generator 533.

The error symbol number calculator 531 may determine the number of error symbols, which allow an error range (or error level) to exceed the error correction capability of the ECC circuit 510a associated with error-and-erasure decoding, with reference to an erasure count No. of ES of the erasure information 520a. For example, when the ECC circuit 510a performs the RS code-based error-and-erasure decoding, the error symbol number calculator 531 may determine the number of error symbols to be $\lfloor(P-N\_Erasure)/2\rfloor+1$ or more (P being the number of parity symbols and N_Erasure being the number of erasures). In this case, the number of error symbols may be proportional to the number of parity symbols, denoted as "P"; as the erasure count No. of ES included in the erasure information 520a increases, the number of error symbols may decrease. Also, the number of error symbols may be less than the number of parity symbols, denoted as "P".

The error vector generator 532 may generate an error vector based on the number of error symbols thus determined. A length of the error vector may be equal to a length of the first codeword CW1 or may be equal to a length of a parity vector added to the first codeword CW1. The error vector generator 532 may inject a symbol of a non-zero value at specific positions of the error vector as much as the determined number of error symbols, and a symbol of a zero value may be injected into the remaining symbols of the error vector. The non-zero value may be in advance set in the ROM. In some implementations, when the number of error symbols is plural, the error symbols may include the same non-zero value. In some implementations, an error symbol may be injected at a symbol position, which does not correspond to an erasure position of the erasure information 520a, from among a plurality of symbol positions of the error vector.

The error injected codeword generator 533 may generate the second codeword CW2 by injecting the error vector generated by the error vector generator 532 into the first codeword CW1 provided from the ECC circuit 510a. The injection of the error vector may be implemented through a symbol unit addition operation of the first codeword CW1 and the error vector. The error injected codeword generator 533 may provide a memory module with the second codeword CW2 thus generated.

FIG. 4 is a diagram describing an example erasure table where erasure information is recorded. The erasure information 520 of FIG. 2 and/or the erasure information 520a of FIG. 3 may be recorded at the erasure table. The erasure table will be described with reference to FIGS. 1, 2, 3, and 4.

The erasure table may be stored in a ROM and may be loaded to an SRAM of a controller in an initial operation of a memory module.

The erasure table may include a memory address, an erasure position, and the number of erasures.

In some implementations, the memory address may be a physical address of the memory device 200 of FIG. 1. FIG. 4 shows an example in which the memory address of the erasure table is a physical address of the memory device 200. For example, the physical address of the memory device 200 may be a start address of a memory block. In some implementations, the memory address may be a start address of a cache line of an SRAM of the host device. For example, when a specific block address of a cache of a host device is set to correspond to a block address of a memory device or when a specific set of the cache of the host device is set to correspond to a block address of the memory device, a cache line (or cache block) is associated with a physical address of the memory device. Accordingly, the memory address of the erasure table may be set based on the cache line.

The erase position may be position information of an erasure in a memory block or cache block of the corresponding memory address. The position information of the erasure may be a symbol unit. For example, when a memory address is a starting address (e.g., 0x001FFFFF) of a specific memory block, the memory address may mean a position of a symbol corresponding to a cell with an error from among a total of symbols capable of being stored in a relevant block. Accordingly, in the case where erase positions are 1 and 3, when a total of symbols capable of being stored in a memory block whose starting address is "0x001FFFFF" are "0" to "n" in order, cells corresponding to the second and fourth symbols may correspond to erasure positions.

The number of erasures means the number of erasures present in a memory device corresponding to the memory address.

At the time of decoding a codeword, the ECC circuit 110 of FIG. 1, the ECC circuit 510 of FIG. 2, and the ECC circuit 510a of FIG. 3 may perform error-and-erasure decoding with reference to an erasure position corresponding to a memory address at which a codeword is read.

The error injecting circuit 120 of FIG. 1, the error injecting circuit 530 of FIG. 2, and the error injecting circuit 530a of FIG. 3 may determine the number of error symbols to be injected into a codeword with reference to the number of erasures corresponding to a write-requested memory address from the host device. Also, the error injecting circuit 120 of FIG. 1, the error injecting circuit 530 of FIG. 2, and the error injecting circuit 530a of FIG. 3 may inject an error symbol at a position of an error vector, which is not an erasure position, with reference to the erasure position corresponding to the write-requested memory address.

Figure 5A:
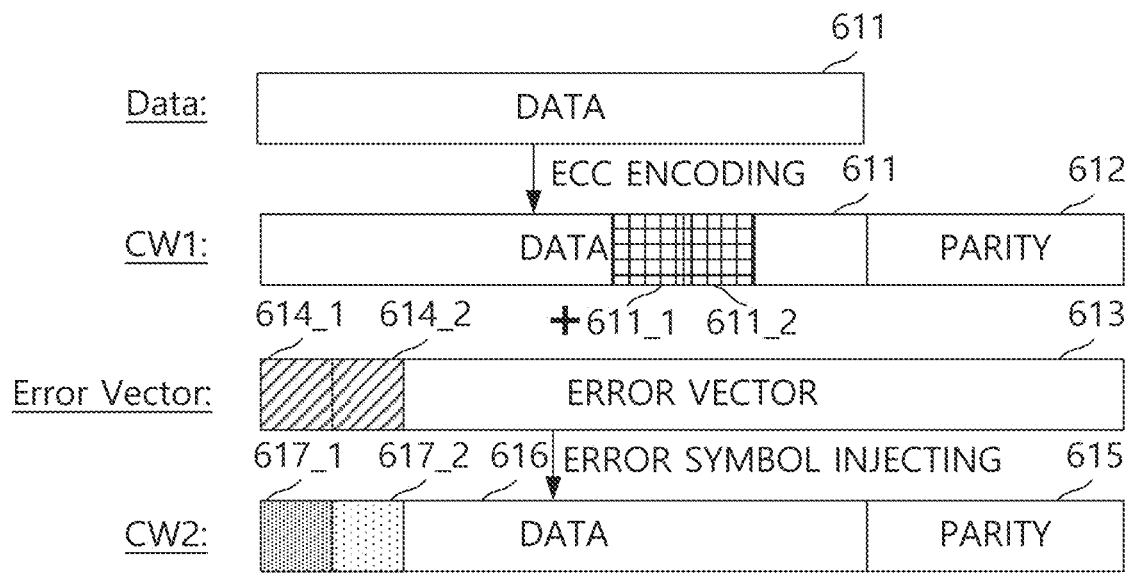
FIGS. 5A, 5B, and 5C are example diagrams describing injection of an error symbol.
Figure 5B:
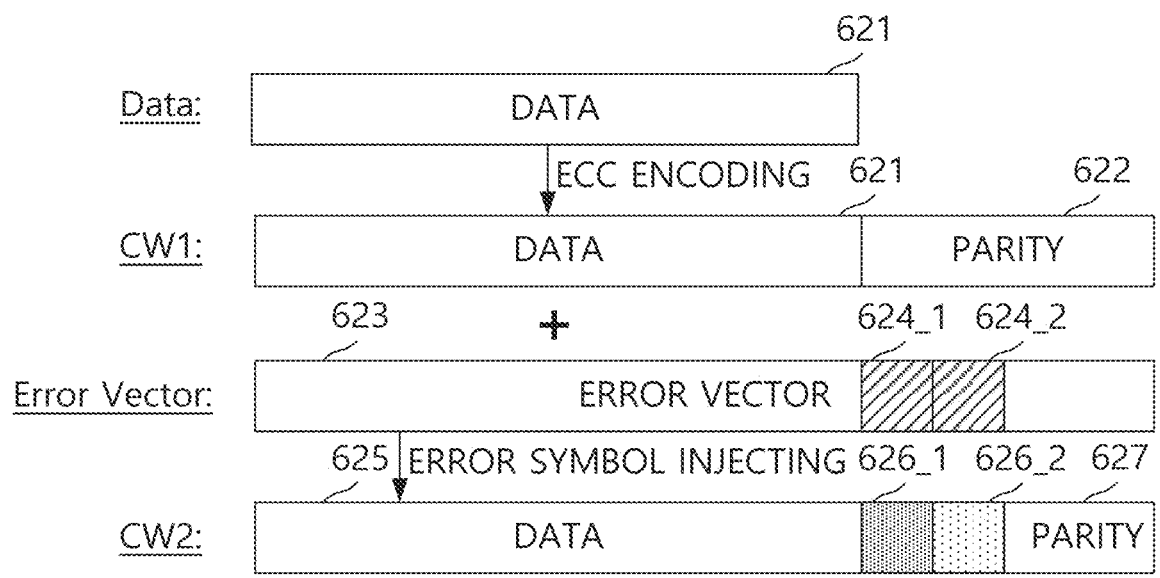
Figure 5C:
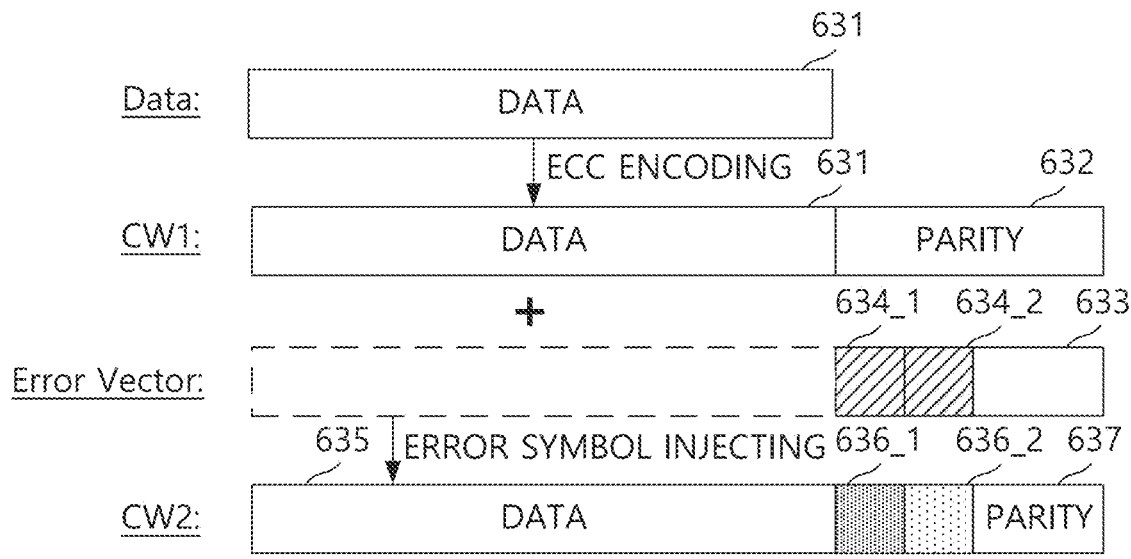

FIGS. 5A, 5B, and 5C are example diagrams describing injection of an error symbol. The injection of the error symbol may be performed by the error injecting circuit 120 of FIG. 1, the error injecting circuit 530 of FIG. 2, and the error injecting circuit 530a of FIG. 3. The injection of the error symbol will be described with reference to FIGS. 4 and 5A to 5C. The description will be given with reference to FIGS. 4 and 5A to 5C under the assumption that ECC encoding is symbol-unit decoding based on the Reed-Solomon (RS) code.

The ECC circuit 110 of FIG. 1, the ECC circuit 510 of FIG. 2, and the ECC circuit 510a of FIG. 3 may generate a parity vector 612/622/632 in which parity information is included, by performing ECC encoding for data 611/621/631 requested by the host device to be written in a memory device. The ECC circuit 110 of FIG. 1, the ECC circuit 510 of FIG. 2, and the ECC circuit 510a of FIG. 3 may generate the first codeword CW1 by adding the parity vector 612/622/632 to the data 611/621/631. Alternatively, unlike the examples illustrated in FIGS. 5A to 5C, the ECC circuit 110 of FIG. 1, the ECC circuit 510 of FIG. 2, and the ECC circuit 510a of FIG. 3 may generate encoded data by encoding the data 611/621/631. The ECC circuit 110 of FIG. 1, the ECC circuit 510 of FIG. 2, and the ECC circuit 510a of FIG. 3 may generate the first codeword CW1 by adding the parity vector 612/622/632 to the encoded data.

The error injecting circuit 120 of FIG. 1, the error injecting circuit 530 of FIG. 2, and the error injecting circuit 530a of FIG. 3 may determine the number of error symbols with reference to the number of erasures of the erasure table of FIG. 4. FIGS. 5A to 5C describe an example where the number of error symbols is 2.

Referring to FIG. 5A, the error injecting circuit 120 of FIG. 1, the error injecting circuit 530 of FIG. 2, and the error injecting circuit 530a of FIG. 3 may inject error symbols of the non-zero value at positions of an error vector 613, which do not correspond erasure positions, with reference to the erasure positions of the erasure table of FIG. 4. FIG. 5A shows an example where the number of erasures is 2 and the erasure positions include a first position 611_1 and a second position 611_2. Also, FIG. 5A shows an example in which the number of error symbols is 2. The description will be given with reference to FIG. 5A under the assumption that erasure positions correspond to two positions among positions of the data 611. However, because the codeword CW2 where an error is injected is transmitted to a memory device and is stored in a data region, erasure positions may correspond to some of positions of the parity vector 612. The error injecting circuit 120 of FIG. 1, the error injecting circuit 530 of FIG. 2, and the error injecting circuit 530a of FIG. 3 may generate the error vector 613 whose length is equal to the length of the first codeword CW1. Error symbols of the non-zero value may be respectively injected at positions 614_1 and 614_2 of the generated error vector 613, which do not correspond to the first position 611_1 and the second position 611_2 being the erasure positions. Symbols of the zero value may be injected into the remaining symbols of the error vector 613. The error injecting circuit 120 of FIG. 1, the error injecting circuit 530 of FIG. 2, and the error injecting circuit 530a of FIG. 3 may generate the second codeword CW2 where an error symbol(s) is injected, by performing an addition operation on the generated error vector 613 and the first codeword CW1 in units of symbol. Accordingly, values of symbols 617_1 and 617_2 corresponding to the positions 614_1 and 614_2 of the error symbols from among symbols of the second codeword CW2 may be determined by adding the first codeword CW1 and the error vector 613. In this case, the remaining symbols not corresponding to the positions 614_1 and 614_2 of the error symbols from among the symbols of the second codeword CW2 may be the same as the remaining symbols of the first codeword CW1.

Referring to FIG. 5B, the error injecting circuit 120 of FIG. 1, the error injecting circuit 530 of FIG. 2, and the error injecting circuit 530a of FIG. 3 may inject error symbols of the non-zero value at positions of an error vector 623, which correspond to positions of the parity vector 622 of the first codeword CW1. FIG. 5B shows an example in which the number of error symbols is 2. The error injecting circuit 120 of FIG. 1, the error injecting circuit 530 of FIG. 2, and the error injecting circuit 530a of FIG. 3 may generate the error vector 623 whose length is equal to the length of the first codeword CW1. Error symbols of the non-zero value may be respectively injected at positions 624_1 and 624_2 of the generated error vector 623, which correspond to positions of the parity vector 622 of the first codeword CW1. Symbols of the zero value may be injected into the remaining symbols of the error vector 623. The error injecting circuit 120 of FIG. 1, the error injecting circuit 530 of FIG. 2, and the error injecting circuit 530a of FIG. 3 may generate the second codeword CW2 where an error symbol(s) is injected, by performing an addition operation on the generated error vector 623 and the first codeword CW1 in units of symbol. Accordingly, values of symbols 626_1 and 626_2 corresponding to the positions 624_1 and 624_2 of the error symbols from among symbols of the second codeword CW2 may be determined by adding the first codeword CW1 and the error vector 623. In this case, the remaining symbols not corresponding to the positions 624_1 and 624_2 of the error symbols from among the symbols of the second codeword CW2 may be the same as the remaining symbols of the first codeword CW1.

Referring to FIG. 5C, the error injecting circuit 120 of FIG. 1, the error injecting circuit 530 of FIG. 2, and the error injecting circuit 530a of FIG. 3 may generate an error vector 633 whose length is equal to the length of the parity vector 632 of the first codeword CW1. FIG. 5C shows an example in which the number of error symbols is 2. The error injecting circuit 120 of FIG. 1, the error injecting circuit 530 of FIG. 2, and the error injecting circuit 530a of FIG. 3 may inject error symbols of the non-zero value at two positions 634_1 and 634_2 of the error vector 633. Symbols of the zero value may be injected into the remaining symbols of the error vector 633. The error injecting circuit 120 of FIG. 1, the error injecting circuit 530 of FIG. 2, and the error injecting circuit 530a of FIG. 3 may generate the second codeword CW2 where an error symbol(s) is injected, by performing an addition operation on the generated error vector 633 and the parity vector 632 of the first codeword CW1 in units of symbol.

Although not illustrated in FIGS. 5B to 5C, some of the positions of the parity vector 622/632 may be erasure positions. In this case, the error injecting circuit 120 of FIG. 1, the error injecting circuit 530 of FIG. 2, and the error injecting circuit 530a of FIG. 3 may inject an error symbol at a position of the error vector 623/633, which does not correspond to an erasure position.

As an error symbol is inserted at a position of an error vector, which does not correspond to an erasure position, even when the ECC circuit 110 of FIG. 1, the ECC circuit 510 of FIG. 2, and the ECC circuit 510*a* of FIG. 3 performs error-and-erasure decoding, error symbols which allow an error range (or error level) to exceed the error correction capability may be injected into the second codeword CW2. Accordingly, the ability to retain the poison information of the second codeword CW2 may be guaranteed.

Figure 6:
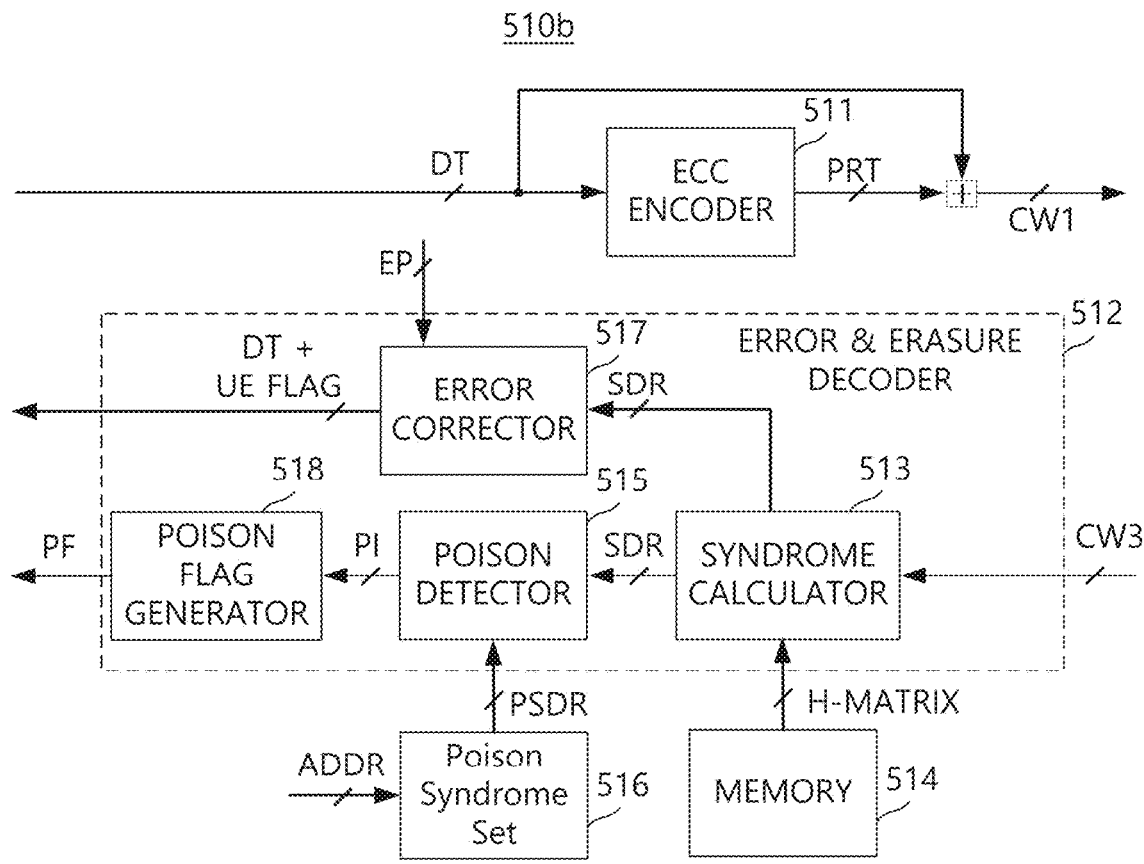
FIG. 6 is a block diagram illustrating a configuration of an example of an error correction code (ECC) circuit.

FIG. 6 is a block diagram illustrating a configuration of an example of an ECC circuit 510*b*. The ECC circuit 510*b* of FIG. 6 may correspond to the ECC circuit 110 of FIG. 1, the ECC circuit 510 of FIG. 2, and the ECC circuit 510*a* of FIG. 3.

Referring to FIG. 6, the ECC circuit 510*b* may include an ECC encoder 511 and an ECC decoder 512.

The ECC encoder 511 may perform ECC encoding for the data DT to generate the parity vector PRT and may add the parity vector PRT to the data DT to generate the first codeword CW1. The ECC encoder 511 may generate the first codeword CW1 by concatenating the parity vector PRT and the data DT together. It is assumed that the data DT are data of a symbol unit. The first codeword CW1 thus generated may be provided to the error injecting circuit 120 of FIG. 1, the error injecting circuit 530 of FIG. 2, and the error injecting circuit 530*a* of FIG. 3.

The ECC decoder 512 may perform ECC decoding based on error-and-erasure decoding. The ECC decoder 512 may be provided with a third codeword CW3. When an error is detected from the third codeword CW3, the ECC decoder 512 may recover the error-corrected data DT from the third codeword CW3 and may provide the recovered data DT and a cleared UE flag to the host device. When an uncorrectable error is detected from the third codeword CW3, the ECC decoder 512 may provide the data DT, in which the error detected from the third codeword CW3 is not corrected, and a set UE flag to the host device.

Referring to FIG. 6, the ECC decoder 512 may include a syndrome calculator 513, a poison detector 515, an error corrector 517, and a poison flag generator 518.

The syndrome calculator 513 may generate a syndrome SDR based on the third codeword CW3 by using a parity check matrix H-MATRIX. The parity check matrix H-MATRIX may be stored in a separate memory 514 such as a ROM.

The error corrector 517 may correct one or more symbol errors by performing ECC decoding for the third codeword CW3 based on the syndrome SDR and may output the data DT. The error corrector 517 may be a Reed-Solomon (RS) decoder which performs decoding based on the Reed-Solomon (RS) code. The error corrector 517 may perform error-and-erasure decoding based on an erasure position EP of the erasure table of FIG. 4. When an uncorrectable error is detected from the third codeword CW3, the error corrector 517 may output a set UE flag. The poison detector 515 may determine whether the third codeword CW3 is a codeword where an error symbol is injected, based on the syndrome SDR and a poison syndrome PSDR. For example, when the syndrome SDR coincides with the poison syndrome PSDR among a plurality of poison syndromes stored in a poison syndrome set 516, the poison detector 515 may determine that an error symbol is injected into the third codeword CW3. The poison syndromes PSDR may be syndromes generated through the calculation of the parity check matrix H-MATRIX and each of error vectors capable of being generated. For example, the poison syndromes PSDR, the number of which is $_nC_2$, may be generated from error vectors, each of which includes two error symbols with the non-zero value, from among error vectors with a symbol length of "n". In some implementations, the poison detector 515 may refer to the address ADDR of the memory device, at which the third codeword CW3 is read, and may determine the number of error symbols based on the number of erasures of the erasure table of FIG. 4, which corresponds to the address ADDR, and the number of parity symbols of the third codeword CW3. Accordingly, the poison detector 515 may compare the syndrome SDR with the poison syndrome PSDR corresponding to the determined number of error symbols from among the plurality of poison syndromes.

The poison detector 515 may transmit a comparison result PI of the poison syndrome PSDR and the syndrome SDR to the poison flag generator 518. When the comparison result PI of the poison syndrome PSDR and the syndrome SDR indicates that the third codeword CW3 is a poisoned codeword, the poison flag generator 518 may set the poison flag PF to "1"; when the comparison result PI of the poison syndrome PSDR and the syndrome SDR indicates that the third codeword CW3 is not a poisoned codeword, the poison flag generator 518 may set the poison flag PF to "0". The generated poison flag PF may be provided to the host device.

The poison flag and the UE flag will be described with reference to FIGS. 6 and 7.

FIG. 7 is an example diagram illustrating a poison flag and an uncorrectable error (UE) flag.

When a codeword read from the memory device is a normal codeword where an error does not occur, the poison detector 515 may set the poison flag to "0", and the error corrector 517 may set the UE flag to "0".

When a codeword read from the memory device is a codeword where an uncorrectable error occurs, the poison detector 515 may set the poison flag to "0", and the error corrector 517 may set the UE flag to "1".

When a codeword read from the memory device is a codeword where an error symbol is injected, the poison detector 515 may set the poison flag to "1", and the error corrector 517 may set the UE flag to "1".

An error injecting circuit may inject error symbols, which allow an error range (or error level) to exceed the error correction capability of an ECC decoder, into a poisoned codeword, and thus, the codeword where the error symbols are injected may not be error-corrected by the ECC decoder. That is, the codeword where the error symbols are injected may stably maintain poison information. Accordingly, because a read codeword is a codeword where error symbols are injected, the error corrector 517 may fail to correct an error of the read codeword. In this case, the error corrector 517 may set the UE flag to "1".

Figure 8:
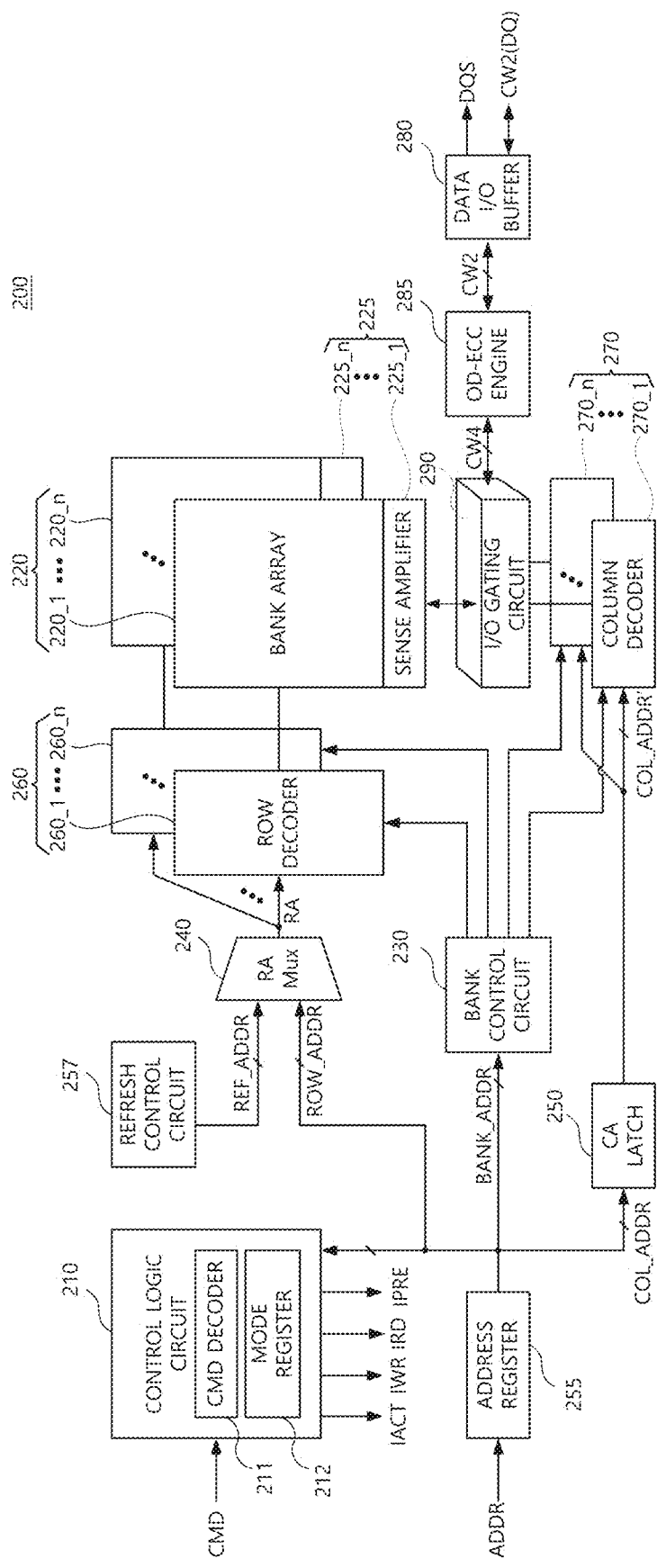
FIG. 8 is a diagram illustrating an example of a memory device.

FIG. 8 is a block diagram illustrating an example of the memory device 200. The memory device 200 of FIG. 8 may correspond to the memory device 200 of FIG. 1.

Referring to FIG. 8, the memory device 200 may include the control logic circuit 210, an address register 255, bank control circuit 230, a refresh control circuit 257, a row address multiplexer 240, a column address latch 250, a row decoder 260, a column decoder 270, the memory cell array 220, a sense amplifier unit 225, an input/output gating circuit 290, an on-die ECC engine 285, and a data input/output buffer 280.

The memory cell array 220 may include a plurality of bank arrays 220_1 to 220_*n*. Each of the plurality of bank arrays 220_1 to 220_*n* may include a plurality of memory cells. For example, each of the plurality of memory cells may be formed at an intersection of a corresponding word line and a corresponding bit line.

The row decoder 260 may include a plurality of sub-row decoders 260_1 to 260_*n*. Each of the plurality sub-row decoders 260_1 to 260_n may be connected to the corresponding bank array among the plurality of bank arrays 220_1 to 220_n.

The sense amplifier unit 225 may include a plurality of sense amplifiers 225_1 to 225_n. Each of the plurality of sense amplifiers 225_1 to 225_n may be connected to the corresponding bank array among the plurality of bank arrays 220_1 to 220_n.

The column decoder 270 may include a plurality of sub-column decoders 270_1 to 270_n. Each of the plurality of sub-column decoders 270_1 to 270_n may be connected to the corresponding bank array among the plurality of bank arrays 220_1 to 220_n through the corresponding sense amplifier.

The plurality of bank arrays 220_1 to 220_n, the plurality of sense amplifiers 225_1 to 225_n, the plurality of sub-column decoders 270_1 to 270_n, and the plurality of sub-row decoders 260_1 to 260_n may constitute the plurality of bank arrays 220_1 to 220_n. For example, the first bank array 220_1, the first sense amplifier 225_1, the first sub-column decoder 270_1, and the first sub-row decoder 260_1 may constitute the first bank array 220_1.

The address register 255 may receive the address ADDR including a bank address BANK_ADDR, a row address ROW_ADDR, and a column address COL_ADDR from the controller 100. The address register 255 may provide the received bank address BANK_ADDR to the bank control circuit 230, may provide the received row address ROW_ADDR to the row address multiplexer 240, and may provide the received column address COL_ADDR to the column address latch 250.

The bank control circuit 230 may generate bank control signals in response to the bank address BANK_ADDR. A sub-row decoder corresponding to the bank address BANK_ADDR from among the plurality of sub-row decoders 260_1 to 260_n may be activated in response to the bank control signals. A sub-column decoder corresponding to the bank address BANK_ADDR from among the plurality of sub-column decoders 270_1 to 270_n may be activated in response to the bank control signals.

The row address multiplexer 240 may receive the row address ROW_ADDR from the address register 255 and may receive a refresh row address REF_ADDR from the refresh control circuit 257. The row address multiplexer 240 may selectively output the row address ROW_ADDR or the refresh row address REF_ADDR as a row address RA. The row address RA output from the row address multiplexer 240 may be applied to each of the plurality of sub-row decoders 260_1 to 260_n.

In response to refresh signals from the control logic circuit 210, in a normal refresh mode, the refresh control circuit 257 may sequentially increase or decrease the refresh row address REF_ADDR.

A sub-row decoder selected by the bank control circuit 230 from among the plurality of sub-row decoders 260_1 to 260_n may activate a word line correspond to the row address RA from the row address multiplexer 240. For example, the selected sub-row decoder may apply a word line driving voltage to the word line corresponding to the row address RA.

The column address latch 250 may receive the column address COL_ADDR from the address register 255 and may temporarily store the received column address COL_ADDR. Also, for example, in a burst mode, the column address latch 250 may sequentially increase the received column address COL_ADDR. The column address latch 250 may apply the temporarily stored column address COL_ADDR or the sequentially increased column address COL_ADDR to each of the plurality of sub-column decoders 270_1 to 270_n.

A sub-column decoder activated by the bank control circuit 230 from among the plurality of sub-column decoders 270_1 to 270_n may activate a sense amplifier corresponding to the bank address BANK_ADDR and the column address COL_ADDR through the input/output gating circuit 290.

The input/output gating circuit 290 may include circuits gating input/output data. Also, the input/output gating circuit 290 may include data latches for storing a codeword output from the plurality of bank arrays 220_1 to 220_n and write drivers for writing data in the plurality of bank arrays 220_1 to 220_n.

In some implementations, in the read operation, a fourth codeword CW4 read from a bank array selected from the plurality of bank arrays 220_1 to 220_n may be sensed by a sense amplifier corresponding to the selected bank array and may be stored in the data latches of the input/output gating circuit 290. Also, ECC decoding for the fourth codeword CW4 stored in the data latches may be performed by the on-die ECC engine 285, and the second codeword CW2 may be provided to the data input/output buffer 280 as a result of the ECC decoding. The data input/output buffer 280 may generate the data signal DQ based on the second codeword CW2 and may provide the data signal DQ to the controller 100 together with a strobe signal DQS.

In some implementations, in the write operation, the second codeword CW2 to be written in a bank array selected from the plurality of bank arrays 220_1 to 220_n may be received by the data input/output buffer 280 as the data signal DQ. The data input/output buffer 280 may convert the data signal DQ into the second codeword CW2 so as to be provided to the on-die ECC engine 285. The on-die ECC engine 285 may generate parity bits (or parity data) based on the second codeword CW2 and may provide the input/output gating circuit 290 with the fourth codeword CW4 including the second codeword CW2 and the parity bits. The input/output gating circuit 290 may write the fourth codeword CW4 in the selected bank array.

According to some implementations, the second codeword CW2 provided to the data input/output buffer 280 may be a codeword including data which the host device provides, parity information which the ECC circuit 110 of FIG. 1 generates based on the data, and an error symbol which the error injecting circuit 120 of FIG. 1 generates. That is, the on-die ECC engine 285 may generate the fourth codeword CW4 by performing ECC encoding for the whole second codeword CW2 in which the data provided from the host device, the parity information, and the error symbol are included.

In the write operation, the data input/output buffer 280 may convert the data signal DQ into the second codeword CW2 so as to be provided to the on-die ECC engine 285. In the read operation, the data input/output buffer 280 may convert the second codeword CW2 from the on-die ECC engine 285 into the data signal DQ.

The control logic circuit 210 may control operations of the memory device 200. For example, the control logic circuit 210 may generate control signals such that the memory device 200 performs the write operation, the read operation, and the refresh operation. The control logic circuit 210 may include a command decoder 211 which decodes the command CMD received from the controller 100 and a mode register (MRS) 212 for setting an operation mode of the memory device 200.

The command decoder 211 may decode the command CMD to generate internal command signals such as an internal active signal IACT, an internal precharge signal IPRE, an internal read signal IRD, and an internal write signal IWR. Also, the command decoder 211 may generate control signals corresponding to the command CMD by decoding a chip select signal and a command/address signal.

Figure 9:
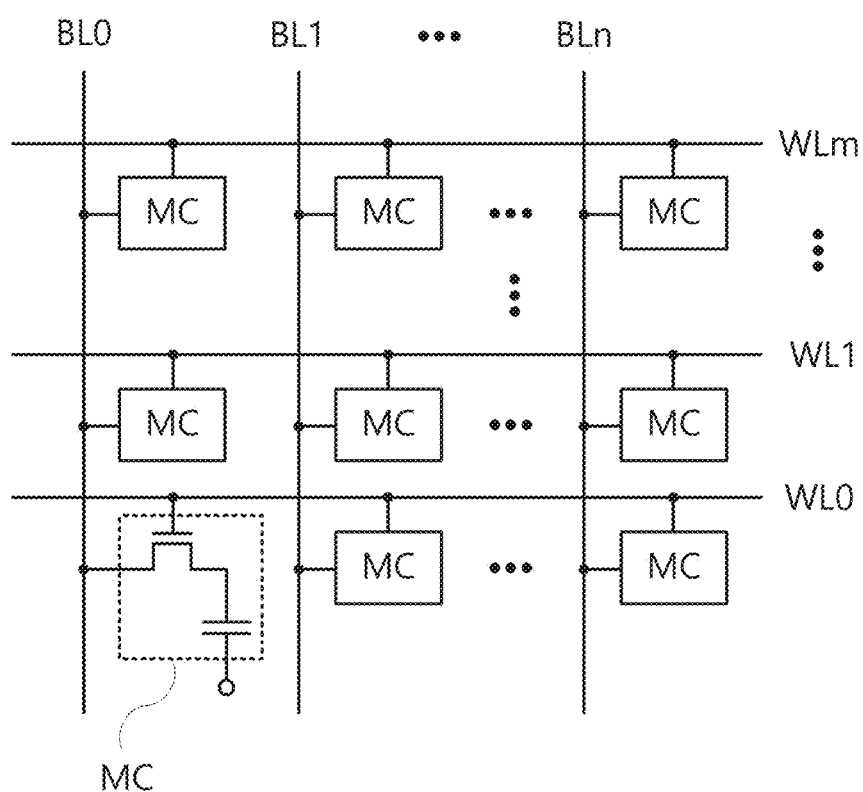
FIG. 9 is an example diagram illustrating a partial region of a bank array of FIG. 8.

FIG. 9 is an example diagram illustrating a partial region of a bank array of FIG. 8. The bank array 220_1 of FIG. 9 may correspond, for example, to the first bank array 220_1 of FIG. 8.

Referring to FIG. 9, the first bank array 220_1 may include a plurality of word lines WL0 to WLm, a plurality of bit lines BL0 to BLn, and a plurality of memory cells MC disposed at intersections of the word lines WL0 to WLm and the bit lines BL0 to BLn.

In some implementations, each memory cell MC may be a DRAM cell. For example, each memory cell MC may include a cell transistor connected to a word line and a bit line and a cell capacitor connected to the cell transistor.

Each word line extending in a row direction may be referred to as a "row" of the first bank array 220_1. Each bit line extending in a column direction may be referred to as a "column" of the first bank array 220_1.

A codeword where an error symbol is injected may be stored in a plurality of memory cells MC. Also, each error symbol may be stored in a plurality of memory cells MC. That is, because the second codeword CW2 to be written in a bank array of FIG. 8 is a codeword of a symbol unit, one symbol may be stored in a plurality of memory cells MC composed of a plurality of bits.

Figure 10:
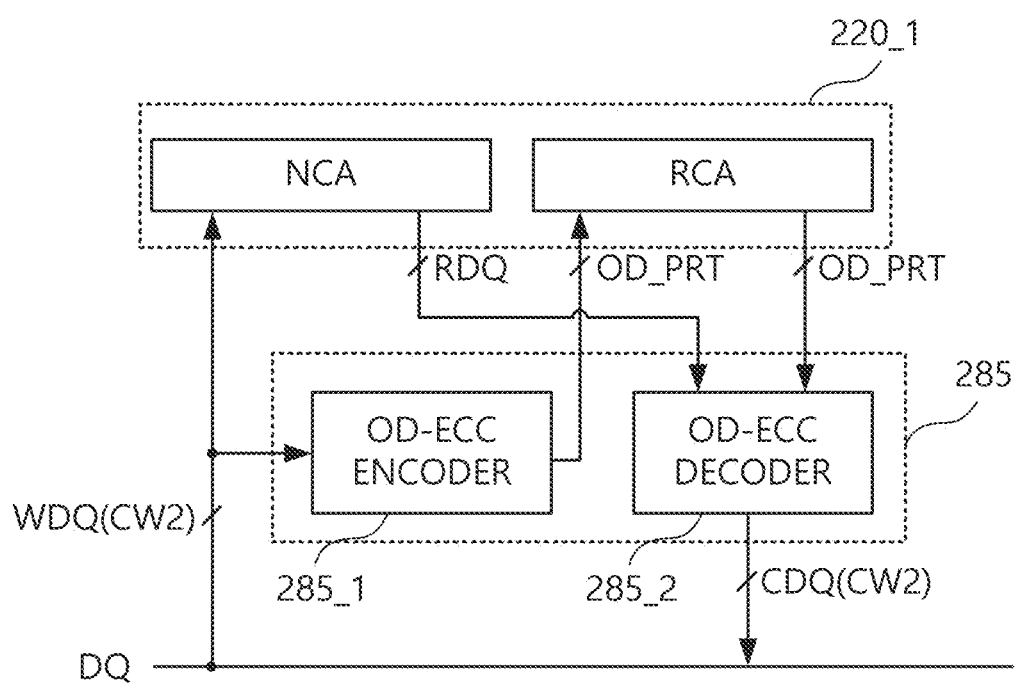
FIG. 10 is an example diagram illustrating a configuration of an on-die ECC engine.

FIG. 10 is an example diagram illustrating a configuration of an on-die ECC engine. The on-die ECC engine 285 of FIG. 10 may correspond, for example, to the on-die ECC engine 285 of FIG. 8.

The on-die ECC engine 285 may include an on-die ECC encoder 285_1 and an on-die ECC decoder 285_2. The first bank array 220_1 is illustrated in FIG. 10 together with the on-die ECC engine 285. The first bank array 220_1 may include a normal cell array NCA and a redundancy cell array RCA.

The on-die ECC encoder 285_1 may generate parity bits OD_PRT associated with write data WDQ to be stored in the normal cell array NCA of the first bank array 220_1. The parity bits OD_PRT may be stored in the redundancy cell array RCA of the first bank array 220_1.

The on-die ECC decoder 285_2 may perform ECC decoding of read data RDQ by using the read data RDQ and the parity bits OD_PRT read from the first bank array 220_1. The on-die ECC decoder 285_2 may correct at least one error bit and may output corrected data CDQ.

According to some implementations, each of the write data WDQ and the corrected data CDQ may be the second codeword CW2. The second codeword CW2 may be a codeword including data which the host device provides, parity information which the ECC circuit 110 of FIG. 1 generates based on the data, and an error symbol which the error injecting circuit 120 of FIG. 1 generates. That is, the on-die ECC encoder 285_1 may generate the parity bits OD_PRT by performing ECC encoding for the whole second codeword CW2 in which the data provided from the host device, the parity information, and the error symbol are included. The on-die ECC decoder 285_2 may perform ECC decoding for the read data RDQ and may generate the second codeword CW2, which includes the data provided from the host device, the parity information, and the error symbol, as the corrected data CDQ.

Figure 11:
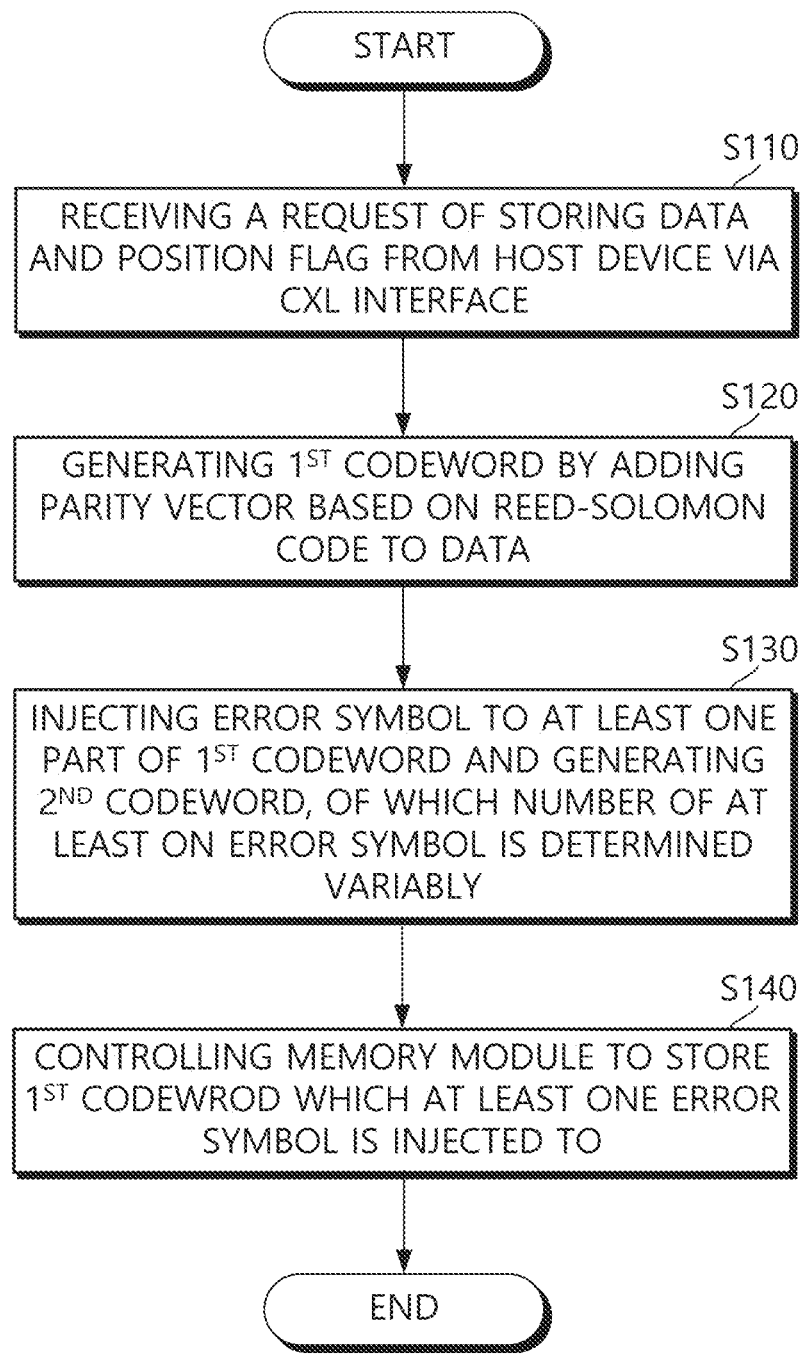
FIG. 11 is a flowchart illustrating an example of an operation of a controller controlling a memory module.

FIG. 11 is a flowchart illustrating an example of an operation of a controller controlling a memory module. A controller to be described in FIG. 11 may correspond to the controller 100 of FIG. 1 and/or the controller 100a of FIG. 1.

In operation S110, the controller 100/100a may receive a request for storing data and a poison flag from a host device through a CXL interface. The poison flag may include information about whether data to be stored are poisoned data. For example, the set poison flag may indicate that data to be stored are poisoned data, and the cleared poison flag may indicate that data to be stored are not poisoned data.

In operation S120, the controller 100/100a may generate a parity vector by performing ECC encoding for received data based on the Reed-Solomon (RS) code and may generate a first codeword by adding the generated parity vector to the data.

In operation S130, the controller 100/100a may generate an error vector to be injected into the first codeword. The error vector may include at least one error symbol. The controller 100/100a may determine the number of error symbols which allow an error range (or error level) to exceed the error correction capability of an ECC decoder. For example, when RS code-based error decoding is performed, the controller 100/100a may determine the number of error symbols to be $\lfloor P/2 \rfloor+1$ or more (P being the number of parity symbols), for the purpose of recording poison information. When the ECC decoder performs the RS code-based error-and-erasure decoding, the controller 100/100a may determine the number of error symbols to be $\lfloor (P-N\_Erasure)/2 \rfloor+1$ or more (P being the number of parity symbols and N_Erasure being the number of erasures). Accordingly, the number of error symbols may be variably determined.

The controller 100/100a may determine the number of error symbols based on a cache line of an SRAM of a host device, at which the received data are stored, or the number of erasures associated with a physical address of a memory device, at which the received data are to be stored. The number of erasures may be the number of erasures stored in the erasure table.

The controller 100/100a may generate a second codeword by injecting the determined number of error symbols into at least a portion of the first codeword. The controller 100/100a may inject an error symbol(s) into the data of the first codeword or may inject an error symbol(s) into the parity vector of the first codeword. The controller 100/100a may generate the second codeword by injecting an error symbol(s) into the first codeword through the symbol-based addition of the error vector and the first codeword.

The controller 100/100a may inject an error symbol(s) at a position(s) of the first codeword, which is not associated with erasure information. That is, the controller 100/100a may inject an error symbol(s) at a position(s) of the error vector, which corresponds to a position(s) not associated with the erasure information from among positions of the first codeword.

In operation S140, the controller 100/100a may control the memory device 200 such that the second codeword where the error symbol(s) is injected is stored in the memory cell array 220.

Figure 12:
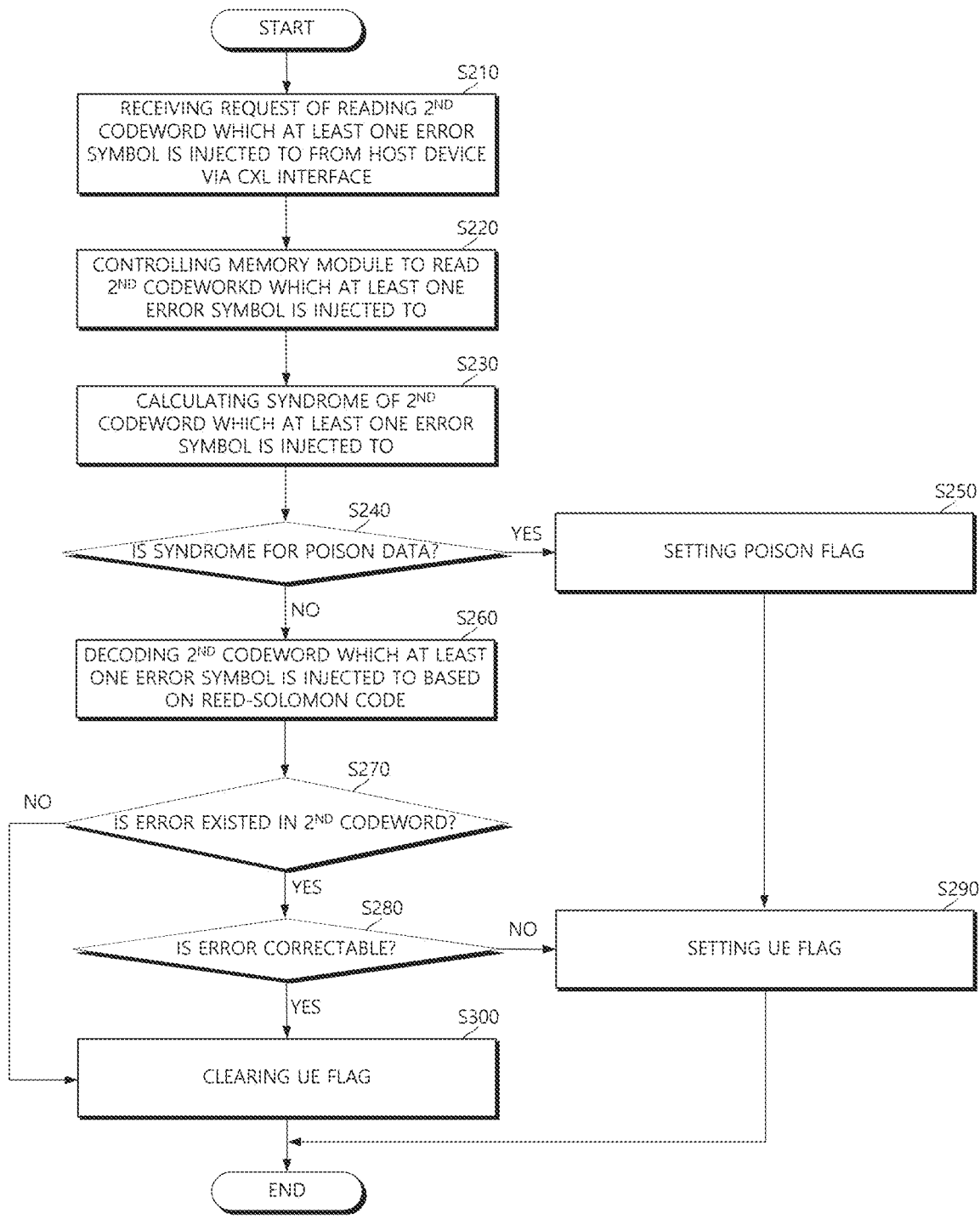
FIG. 12 is a flowchart illustrating an example of an operation in which a controller controlling a memory module sets a poison flag and a UE flag.

FIG. 12 is a flowchart illustrating an example of an operation in which a controller controlling a memory module sets a poison flag and a UE flag. A controller to be described in FIG. 11 may correspond to the controller 100 of FIG. 1 and/or the controller 100a of FIG. 1.

In operation S210, the controller 100/100a may receive a request for reading a second codeword, into which an error symbol(s) is injected, from a host device through the CXL interface.

In operation S220, the controller 100/100a may control a memory device to read the second codeword where the error symbol(s) is injected.

In operation S230, the controller 100/100a may calculate a syndrome of the second codeword where an error symbol(s) is injected.

In operation S240, the controller 100/100a may determine whether the syndrome of the second codeword is a syndrome of poisoned data. For example, the controller 100/100a may compare the syndrome of the second codeword with a plurality of poison syndromes generated through the calculation of various types of error vectors and a parity check matrix. When a comparison result indicates that any one poison syndrome coincides with the syndrome of the second codeword, it may be determined that the syndrome of the second codeword is the syndrome of the poisoned data. Accordingly, the controller 100/100a may determine the second codeword as a codeword generated from the poisoned data.

When it is determined that the syndrome of the second codeword is the syndrome of the poisoned data, in operation S250, the controller 100/100a may set a poison flag (e.g., may set the poison flag to "1").

In operation S290, the controller 100/100a may set the UE flag in response to that the poison flag is set.

When it is determined that the syndrome of the second codeword is not the syndrome of the poisoned data, in operation S260, the controller 100/100a may perform ECC decoding for the second codeword. The ECC decoding may be RS code-based decoding. The ECC decoding may be error-and-erasure decoding.

In operation S270, the controller 100/100a may determine whether an ECC decoding result indicates that an error is detected from the second codeword.

In operation S280, the controller 100/100a may determine whether the error detected from the second codeword is an uncorrectable error.

In operation S290, the controller 100/100a may set the UE flag in response to determining that the error detected from the second codeword is an uncorrectable error.

In operation S300, the controller 100/100a may clear the UE flag in response to determining that the error detected from the second codeword is a correctable error or that an error is not detected from the second codeword.

A semiconductor memory device according to the present disclosure may efficiently manage a poison flag.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

While the present disclosure has been described with reference to implementations thereof, it will be apparent to those of ordinary skill in the art that various changes and modifications may be made thereto without departing from the spirit and scope of the present disclosure as set forth in the following claims.

What is claimed is:

1. A Compute eXpress Link (CXL)-based memory module comprising:
    a memory device including a plurality of volatile memory cells, the memory device configured to store data or to read the stored data; and
    a controller configured to communicate with a host device through a CXL interface and to control the memory device,
    wherein the controller includes:
        an error correction code (ECC) circuit configured to generate a first codeword based on adding a parity vector to data received from the host device, the parity vector being generated based on Reed-Solomon encoding;
        an error injecting circuit configured to generate at least one error symbol and to generate a second codeword based on injecting the at least one error symbol into at least a portion of the first codeword; and
        a memory device interface configured to control the memory device such that the second codeword where the at least one error symbol is injected is stored in the memory device, and
    wherein the controller determines a variable number of the at least one error symbol to be injected into the first codeword.

2. The CXL-based memory module of claim 1, wherein the variable number of the at least one error symbol is determined based on a cache line in which the received data are stored or erasure information associated with a physical address of the memory device, the physical address of the memory device being controlled by the host device to store the received data.

3. The CXL-based memory module of claim 2, wherein the variable number of the at least one error symbol is inversely proportional to a number of erasures of the erasure information.

4. The CXL-based memory module of claim 2, wherein the variable number of the at least one error symbol is proportional to a length of the parity vector.

5. The CXL-based memory module of claim 2, wherein the error injecting circuit is configured to inject the at least one error symbol at a position of the first codeword, the position not associated with the erasure information.

6. The CXL-based memory module of claim 1, wherein the error injecting circuit is configured to inject the at least one error symbol into the parity vector of the first codeword.

7. The CXL-based memory module of claim 1, wherein the variable number of the at least one error symbol is less than a number of parity symbols included in the parity vector.

8. The CXL-based memory module of claim 1, wherein the error injecting circuit is configured to generate the at least one error symbol based on a poison flag being associated with the received data and being transmitted from the host device.

9. The CXL-based memory module of claim 1, wherein the memory device includes:
    an on-die ECC engine configured to generate a third codeword in which a parity bit generated based on the second codeword is added.

10. The CXL-based memory module of claim 1, wherein the memory device interface is configured to control the memory device based on an address received from the controller such that the second codeword in which the at least one error symbol is injected is read, and
wherein the ECC circuit is configured to
calculate a syndrome of the second codeword in which the at least one error symbol is injected; and
generate a set poison flag based on the syndrome being associated with the at least one error symbol.

11. The CXL-based memory module of claim 10, wherein the ECC circuit is configured to:
compare the syndrome of the second codeword with a poison syndrome that is associated with the address from a plurality of poison syndromes, thereby generating a comparison result; and
generate the set poison flag based on the comparison result.

12. The CXL-based memory module of claim 1, wherein the error injecting circuit is configured to:
generate an error vector, the error vector including the at least one error symbol with a non-zero value and a plurality of symbols with a zero value; and
perform an addition operation on the error vector and the first codeword in units of symbol.

13. The CXL-based memory module of claim 12, wherein the error injecting circuit is configured to perform the addition operation on the error vector and the parity vector of the first codeword in units of symbol.

14. The CXL-based memory module of claim 12, wherein a size of the error vector is equal to a size of the first codeword or a size of the parity vector.

15. An operating method of a controller configured to control a memory device, the method comprising:
receiving, at the controller, an instruction to store data from a host device together with a poison flag through a Compute eXpress Link (CXL) interface;
adding, at the controller, a parity vector to the data received from the host device to generate a first codeword, the parity vector being generated based on Reed-Solomon (RS) encoding;
injecting, at the controller, at least one error symbol into at least a portion of the first codeword to generate a second codeword; and
controlling, at the controller, the memory device such that the second codeword in which the at least one error symbol is injected is stored,
wherein a variable number of the at least one error symbol to be injected into the first codeword is determined by the controller.

16. The method of claim 15, wherein injecting the at least one error symbol includes:
determining the variable number of the at least one error symbol based on a cache line of the host device, at which the data are stored, or erasure information associated with a physical address of the memory device, at which the host device directs to store the data; and
generating the at least one error symbol based on the variable number of the at least one error symbol.

17. The method of claim 16, wherein the number of the at least one error symbol is inversely proportional to a number of erasures of the erasure information and is proportional to a length of the parity vector.

18. The method of claim 16, wherein injecting the at least one error symbol includes:
injecting the at least one error symbol at a position of the first codeword, the position not associated with the erasure information.

19. The method of claim 15, comprising:
receiving, from the host device through the CXL interface, a direction to read the second codeword in which the at least one error symbol is injected;
controlling the memory device to read the second codeword in which the at least one error symbol is injected;
calculating a syndrome of the second codeword in which the at least one error symbol is injected;
generating a set poison flag based on the syndrome being a syndrome associated with the at least one error symbol; and
transmitting data and the set poison flag to the host device, the data being obtained based on performing RS decoding for the second codeword where the at least one error symbol is injected.

20. A computing device comprising:
a central processing unit (CPU);
a memory device including a plurality of volatile memory cells; and
a controller configured to
communicate with the CPU through a Compute eXpress Link (CXL) interface; and
control the memory device based on a command and an address that the CPU transmits,
wherein the memory device is configured to store or read data in or from the plurality of volatile memory cells under control of the controller, and
wherein the controller is configured to:
determine a variable number of at least one error symbol based on the address;
generate the at least one error symbol based on the variable number of the at least one error symbol; and
inject the at least one error symbol into at least a portion of a codeword, the codeword being generated based on data received from the CPU.

* * * * *